United States Patent
Koo et al.

(10) Patent No.: US 12,537,055 B2
(45) Date of Patent: Jan. 27, 2026

(54) SEMICONDUCTOR DEVICE

(71) Applicant: SK hynix Inc., Icheon (KR)

(72) Inventors: Yoon Mo Koo, Icheon-si (KR); Myoungsub Kim, Icheon-si (KR); Jae Hyuk Park, Icheon-si (KR); Sang Chul Oh, Icheon-si (KR); Beom Seok Lee, Icheon-si (KR); Won Jun Lee, Icheon-si (KR)

(73) Assignee: SK hynix Inc., Icheon (KR)

( * ) Notice: Subject to any disclaimer, the term of this patent is extended or adjusted under 35 U.S.C. 154(b) by 85 days.

(21) Appl. No.: 18/731,731

(22) Filed: Jun. 3, 2024

(65) Prior Publication Data

US 2025/0285676 A1  Sep. 11, 2025

(30) Foreign Application Priority Data

Mar. 8, 2024 (KR) .................. 10-2024-0033350

(51) Int. Cl.
  *G11C 11/34* (2006.01)
  *G11C 13/00* (2006.01)

(52) U.S. Cl.
  CPC ...... *G11C 13/0033* (2013.01); *G11C 13/0028* (2013.01); *G11C 13/004* (2013.01)

(58) Field of Classification Search
  CPC ............ G11C 13/0033; G11C 13/0028; G11C 13/004
  USPC ...................................... 365/185.02
  See application file for complete search history.

(56) References Cited

U.S. PATENT DOCUMENTS

| | | | | |
|---|---|---|---|---|
| 7,369,433 | B2* | 5/2008 | Toda | G11C 16/3445 |
| | | | | 365/185.17 |
| 7,830,701 | B2* | 11/2010 | Siau | G11C 13/0007 |
| | | | | 365/148 |
| 8,947,922 | B2* | 2/2015 | Abedifard | H10N 50/80 |
| | | | | 365/158 |
| 9,870,819 | B2* | 1/2018 | Shiimoto | H10N 70/882 |
| 10,032,508 | B1 | 7/2018 | Srinivasan et al. | |
| 10,930,345 | B1 | 2/2021 | Cui et al. | |
| 12,183,381 | B2* | 12/2024 | Kuzmanov | G11C 11/2273 |
| 12,237,047 | B2* | 2/2025 | Kim | G11C 7/1096 |
| 12,406,727 | B2* | 9/2025 | Shimada | G11C 13/0069 |
| 2007/0133250 | A1* | 6/2007 | Kim | G11C 11/4094 |
| | | | | 365/113 |

* cited by examiner

*Primary Examiner* — Viet Q Nguyen (57) ABSTRACT

A semiconductor device may include a read disturb reduction circuit, a first selection switch that is turned on based on a bit line selection signal, a second selection switch that that is turned on based on a word line selection signal, a memory cell electrically connected between the first selection switch and the second selection switch, a first bias voltage generation circuit configured to provide a first bias voltage to the memory cell through the first selection switch, a second bias voltage generation circuit configured to provide a second bias voltage to the memory cell through the first selection switch, a third bias voltage generation circuit configured to provide a third bias voltage to the memory cell through the second selection switch, and a connection switch configured to electrically connect or separate the read disturbance reduction circuit and the second selection switch.

20 Claims, 8 Drawing Sheets

SEMICONDUCTOR DEVICE

CROSS-REFERENCE TO RELATED APPLICATION

This application claims priority under 35 U.S.C. § 119 to Korean Patent Application No. 10-2024-0033350 filed on Mar. 8, 2024, which is incorporated herein by reference in its entirety.

BACKGROUND

1. Technical Field

Embodiments relate to a semiconductor integrated circuit and, particularly, to a semiconductor device.

2. Related Art

Recently, as an electronic device is reduced in size, has lower power consumption and higher performance, and is diversified, a semiconductor device capable of storing information is required for various electronic devices, such as computers and portable communication devices. Accordingly, a semiconductor device capable of storing data by using a characteristic in which the semiconductor device switches between different resistance states depending on a voltage or current applied thereto is researched. Such a semiconductor device includes resistive random access memory (RRAM), phase change random access memory (PRAM), ferroelectric random access memory (FRAM), magnetic random access memory (MRAM), and an E-fuse.

In particular, a semiconductor device using a switching characteristic in which the state of the semiconductor device is changed into a different state depending on the direction of a current applied to the semiconductor device is being actively researched.

SUMMARY

In an embodiment, a semiconductor device may include a first selection switch that is turned on based on a bit line selection signal, a second selection switch that that is turned on based on a word line selection signal, a memory cell that is electrically connected between the first selection switch and the second selection switch, a first bias voltage generation circuit configured to provide a first bias voltage to the memory cell through the first selection switch, a second bias voltage generation circuit configured to provide a second bias voltage to the memory cell through the first selection switch, a third bias voltage generation circuit configured to provide a third bias voltage to the memory cell through the second selection switch, and a connection switch configured to electrically connect or separate a read disturbance reduction circuit and the second selection switch.

In an embodiment, a semiconductor device may include a memory cell a state of which transitions to a set state when a current having a first direction penetrates the memory cell and a state of which transitions to a reset state when a current having a second direction penetrates the memory cell, a sense amplifier configured to determine the state of the memory cell by detecting a voltage level of the memory cell attributable to a current path that has been formed by providing the memory cell with a current having a direction identical with the first direction, and a read disturbance reduction circuit configured to generate undershoot on the current path when the sense amplifier determines the state of the memory cell.

DETAILED DESCRIPTION

Hereinafter, embodiments according the present disclosure are described with reference to the accompanying drawings.

Embodiments of the present disclosure may provide a semiconductor device capable of storing data by controlling a direction in which a current flows into a memory cell when the data are written in the memory cell.

Embodiments operate to prevent a threshold voltage of a memory cell from being changed due to repeated read operations.

Figure 1:
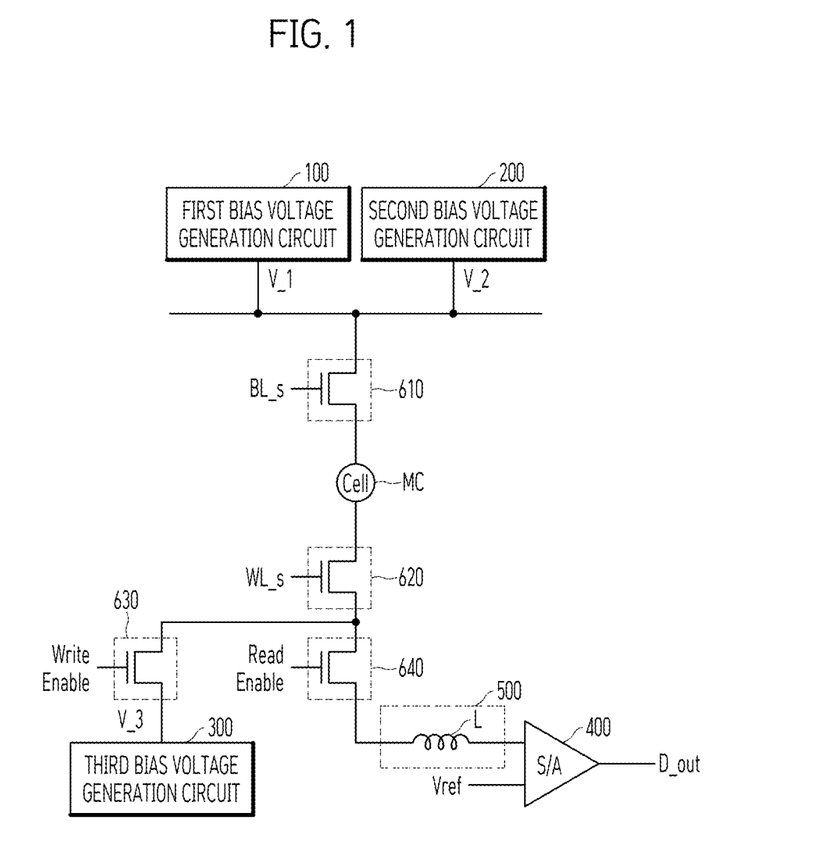
FIG. 1 illustrates a construction of a semiconductor device according to an embodiment of the present disclosure.

FIG. 1 is a diagram for describing a construction of a semiconductor device according to an embodiment of the present disclosure.

Referring to FIG. 1, the semiconductor device according to an embodiment of the present disclosure may include a first bias voltage generation circuit 100, a second bias voltage generation circuit 200, a third bias voltage generation circuit 300, a sense amplifier (S/A) 400, a read disturbance reduction circuit 500, a first selection switch 610, a second selection switch 620, a first connection switch 630, and a second connection switch 640.

The first bias voltage generation circuit 100 may provide a first bias voltage V_1 to a memory cell MC for a set time after the start of a write operation. For example, the first bias voltage generation circuit 100 may provide the first bias voltage V_1 to the memory cell MC through the first selection switch 610 that is turned on for a set time after the start of a write operation. In this case, the first bias voltage V_1 may be a voltage for changing the state of the memory cell into a first state (e.g., a set state).

The second bias voltage generation circuit 120 may provide a second bias voltage V_2 to the memory cell MC for a set time after the start of a read operation. For example, the second bias voltage generation circuit 120 may provide the second bias voltage V_2 to the memory cell MC through the first selection switch 610 that is turned on for a set time after the start of a read operation. In this case, the second bias voltage V_2 may be a voltage having a voltage level at which the state of the memory cell may be determined.

The third bias voltage generation circuit 300 may provide a third bias voltage V_3 to the memory cell MC for a set time after the start of a write operation. For example, the third bias voltage generation circuit 300 may provide the third bias voltage V_3 to the memory cell MC through the second selection switch 620 and the first connection switch 630 that are turned on for a set time after the start of a write operation. In this case, the third bias voltage V_3 may be a voltage for changing the state of the memory cell into a second state (e.g., a reset state).

The sense amplifier 400 may determine the state of the memory cell MC by sensing a voltage that is formed due to the amount of a current that flows through the memory cell MC after the start of a read operation. For example, the sense amplifier 400 may determine whether the state of the memory cell MC is the set state or the reset state by comparing a reference voltage Vref to a voltage that is formed due to a current that flows through the memory cell MC selected by the first and second selection switches 610 and 620. In this case, when the state of the memory cell MC is the set state, the sense amplifier 400 may output an output signal D_out having a low level. Furthermore, when the state of the memory cell MC is the reset state, the sense amplifier 400 may output the output signal D_out having a high level.

After the second bias voltage V_2 is provided to the memory cell MC that is selected for a set time after the start of a read operation, when the providing of the second bias voltage V_2 to the memory cell MC is discontinued, the read disturbance reduction circuit 500 may generate undershoot at a falling edge at which the voltage level of the second bias voltage V_2 is decreased. While the undershoot is performed, a voltage having a polarity opposite the polarity of the voltage when the second bias voltage V_2 is provided may be provided across the memory cell MC, and a current having a direction opposite the direction of the current when the second bias voltage V_2 is provided may be provided to the memory cell MC. For example, when the providing of the second bias voltage V_2 to the memory cell MC that has been selected after the start of a read operation is discontinued, the read disturbance reduction circuit 500 may generate an undershot voltage or an undershot current in a direction opposite a direction in which the second bias voltage V_2 is provided. In this case, the undershot voltage or the undershot current may be provided to the memory cell MC for a time shorter than the time when the second bias voltage V_2 is provided to the memory cell MC, and may have a low voltage level or a small amount of current.

The read disturbance reduction circuit 500 may include an inductor L. The inductor L may have one end connected to the second connection switch 640 and the other end connected to the sense amplifier 400. The inductor L may be connected to a current path along which the second bias voltage generation circuit 200, the first selection switch 610, the memory cell MC, the second selection switch 620, and the sense amplifier 400 are connected after the start of a read operation. The inductor L may generate undershoot when the providing of the second bias voltage V_2 to a current path that is formed due to the second bias voltage V_2 that is provided by the second bias voltage generation circuit 200 after the start of a read operation is discontinued. Therefore, when the second bias voltage V_2 is discontinued after the second bias voltage V_2 is provided for a set time after the start of a read operation, the memory cell MC may be provided with a current having a direction opposite the direction of the current when the second bias voltage V_2 is provided due to the undershoot phenomenon.

The first selection switch 610 and the second selection switch 620 may each be a switch for selecting the memory cell MC. In this case, the first and second selection switches 610 and 620 are described by illustrating one memory cell MC in FIG. 1 for convenience of description, but a construction and operation of the first and second selection switches 610 and 620 may be the same as the construction and operation of each of a plurality of first selection switches and each of a plurality of second selection switches that select at least one memory cell from among a plurality of memory cells. In this case, the first and second selection switches 610 and 620 may be controlled by a bit line selection signal BL_s and a word line selection signal WL_s.

The first selection switch 610 may transmit the first bias voltage V_1 or the second bias voltage V_2 to the memory cell MC that has been selected, among a plurality of memory cells, or may discontinue the transmission of the first bias voltage V_1 or the second bias voltage V_2 to the memory cell MC that has been selected. For example, the first selection switch 610 may electrically connect the first bias voltage generation circuit 100 and the memory cell MC after the start of a write operation. Furthermore, the first selection switch 610 may electrically connect the second bias voltage generation circuit 200 and the memory cell MC after the start of a read operation. More specifically, for example, the first selection switch 610 may electrically connect the first bias voltage generation circuit 100 and the memory cell MC after the start of a write operation based on the bit line selection signal BL_s. Furthermore, the first selection switch 610 may electrically connect the second bias voltage generation circuit 200 and the memory cell MC after the start of a read operation based on the bit line selection signal BL_s. When the first bias voltage generation circuit 100 and the memory cell MC are electrically connected by the first selection switch 610 after the start of a write operation, the first bias voltage V_1 may be provided from the first bias voltage generation circuit 100 to the memory cell MC through the first selection switch 610. Furthermore, when the second bias voltage generation circuit 200 and the memory cell MC are electrically connected by the first selection switch 610 after the start of a read operation, the second bias voltage V_2 may be provided to the memory cell MC from the second bias voltage generation circuit 200 through the first switch 610.

The second selection switch 620 may electrically connect or separate the memory cell MC that has been selected, among a plurality of memory cells, and the first and second connection switches 630 and 640 in order to transmit the third bias voltage V_3 to the memory cell MC that has been selected or to electrically connect the sense amplifier 400 to the memory cell MC that has been selected. For example, the second selection switch 620 may electrically connect the memory cell MC that has been selected and the first and second connection switches 630 and 640 after the start of a write operation or a read operation. More specifically, for example, the second selection switch 620 may electrically connect the memory cell MC that has been selected and the first and second connection switches 630 and 640 after the start of a write or read operation based on the word line selection signal WL_s.

The first connection switch 630 may electrically connect the third bias voltage generation circuit 300 and the second selection switch 620 after the start of a write operation. For example, the first connection switch 630 may electrically connect or separate the third bias voltage generation circuit 300 and the second selection switch 620 based on a write enable signal Write Enable.

The second connection switch 640 may electrically connect the read disturbance reduction circuit 500 and the second selection switch 620 after the start of a read operation. For example, the second connection switch 640 may electrically connect or separate the read disturbance reduction circuit 500 and the second selection switch 620 based on the read enable signal Read Enable.

In this case, the first selection switch 610, the second selection switch 620, the first connection switch 630 and the second connection switch 640 may each be implemented as at least one transistor.

An operation of the semiconductor device constructed as described above according to an embodiment of the present disclosure may be described as follows.

FIGS. 2A to 2C and FIGS. 3 to 5 are diagrams for describing an operation of the semiconductor device according to an embodiment of the present disclosure.

The state of the memory cell MC may transition to the first state and may transition to the second state. In this case, the first state may be a set state, and the second state may be a reset state. Furthermore, the memory cell in the set state may have a threshold voltage or resistance having a higher level than the threshold voltage or resistance of the memory cell in the reset state. In the semiconductor device according to an embodiment of the present disclosure, when a current in a first direction flows into the memory cell MC, the state of the memory cell MC may transition to the set state. When a current in a second direction flows into the memory cell MC, the state of the memory cell MC may transition to the reset state. The first direction and the second direction may be opposite directions.

Figure 2A:
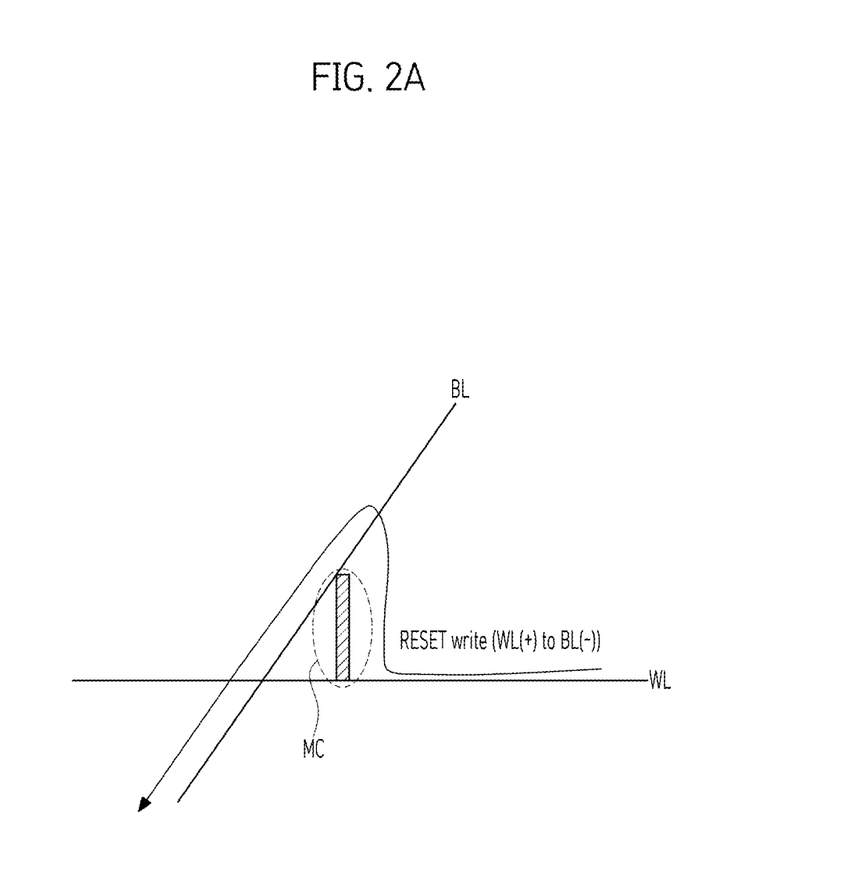
FIGS. 2A to 2C and FIGS. 3 to 5 illustrate an operation of the semiconductor device according to an embodiment of the present disclosure.

Referring to FIG. 2A, the memory cell MC may be connected between a bit line BL and a word line WL. In this case, in order to change the state of the memory cell MC into the reset state, a reset write operation RESET write may be performed. For example, the reset write operation RESET write may be an operation of enabling a current to flow from the word line WL to the bit line BL through the memory cell MC by providing the word line WL with the voltage having a higher voltage level than the voltage of the bit line BL. At this time, a positive voltage (+) may be provided to the word line WL, and a positive voltage having a lower voltage level than the voltage of the word line WL, a ground voltage (e.g., 0 V), or a negative voltage (−) may be provided to the bit line BL. The positive voltage (+) illustrated in FIG. 2A may correspond to the third bias voltage V_3 illustrated in FIG. 1.

Figure 2B:
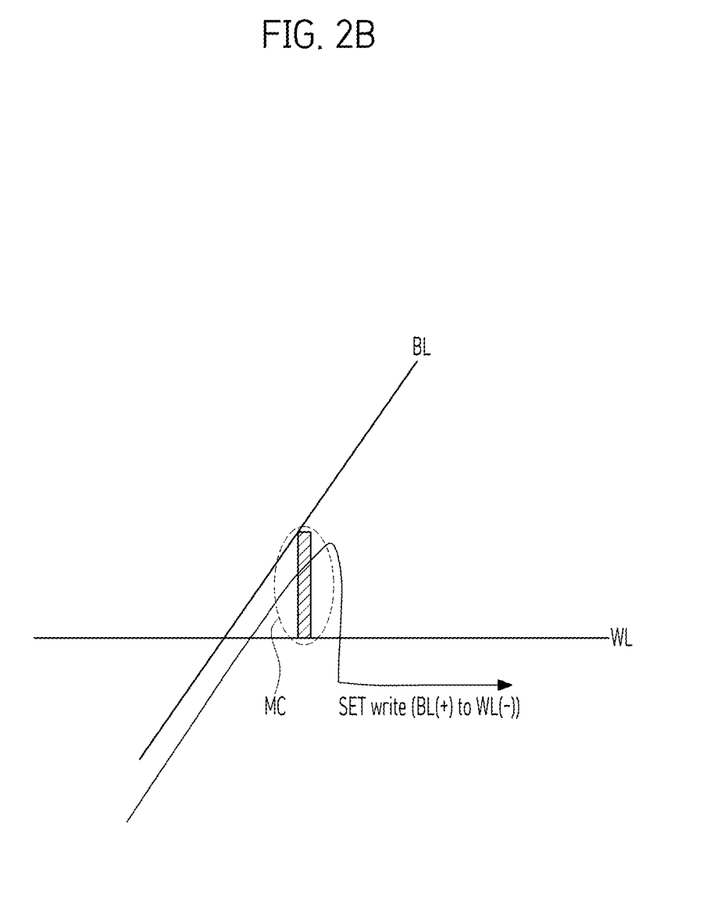

Referring to FIG. 2B, the memory cell MC may be connected between the bit line BL and the word line WL. In this case, in order to change the state of the memory cell MC into the set state, a set write operation SET write may be performed. For example, the set write operation SET write may be an operation of enabling a current to flow from the bit line BL to the word line WL through the memory cell MC by providing the bit line BL with a voltage having a higher voltage level than the voltage of the word line WL. At this time, a positive voltage (+) may be provided to the bit line BL, and a positive voltage having a lower voltage level than the voltage of the bit line BL, the ground voltage (e.g., 0 V), or a negative voltage (−) may be provided to the word line WL. The positive voltage (+) illustrated in FIG. 2B may correspond to the first bias voltage V_1 illustrated in FIG. 1.

Figure 2C:
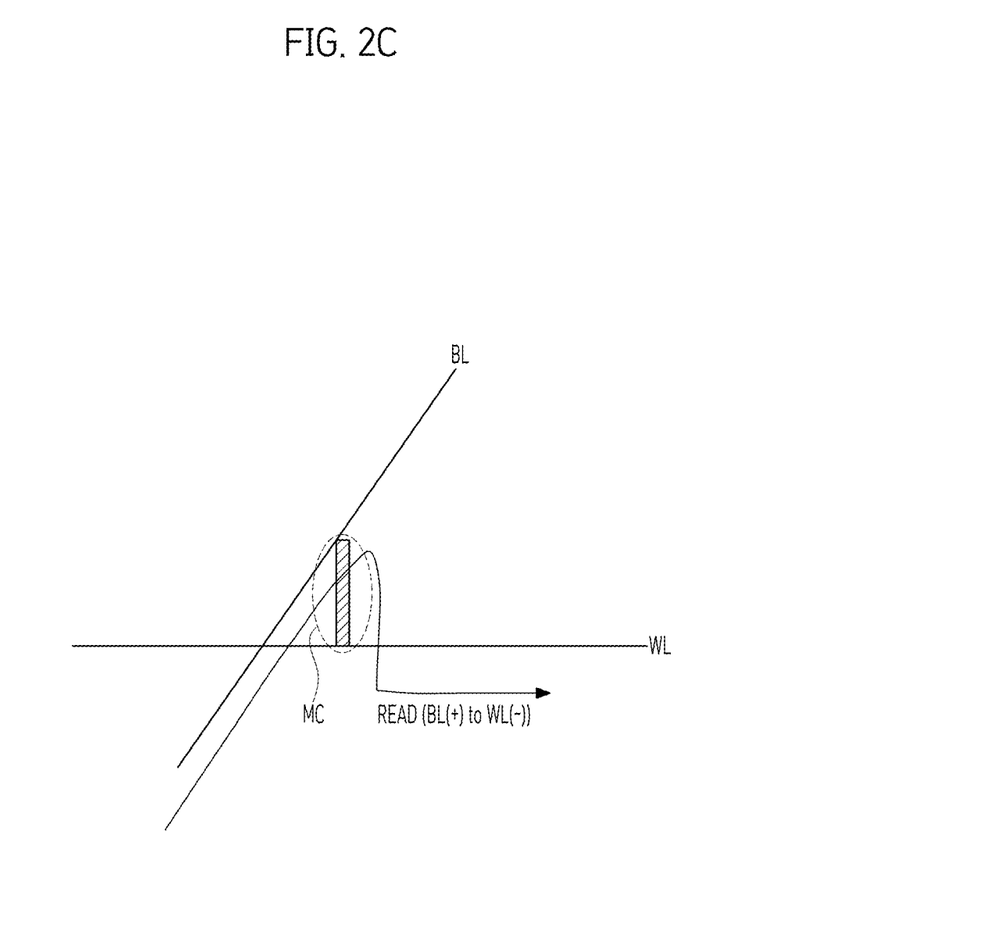

Referring to FIG. 2C, the memory cell MC may be connected between the bit line BL and the word line WL. In this case, in order to determine whether the state of the memory cell MC is the reset state or the set state, a read operation Read may be performed. For example, the read operation Read may be an operation of enabling a current to flow from the bit line BL to the word line WL through the memory cell MC by providing the bit line BL with a voltage having a higher voltage level than the voltage of the word line WL. At this time, a positive voltage (+) may be provided to the bit line BL, and a positive voltage having a lower voltage level than the voltage of the bit line BL, the ground voltage (e.g., 0 V), or a negative voltage (−) may be provided to the word line WL. The positive voltage (+) illustrated in FIG. 2C may correspond to the second bias voltage V_2 illustrated in FIG. 1. In this case, the second bias voltage V_2 may have a lower voltage level than the first bias voltage V_1.

Referring to FIGS. 2A to 2C, the state of the memory cell MC of the semiconductor device according to an embodiment of the present disclosure may transition to the reset state and may transition to the set state. Furthermore, a current direction or voltage polarity when the state of the memory cell MC transitions to the reset state may be opposite a current direction or voltage polarity when the state of the memory cell MC transitions to the set state. Furthermore, in the read operation Read for determining the state of the memory cell, the memory cell MC may be provided with a current having the same direction as a current in the set write operation SET write for changing the state of the memory cell MC into the set state or a voltage having the same polarity as a voltage in the set write operation SET write for changing the state of the memory cell MC into the set state.

Figure 3:
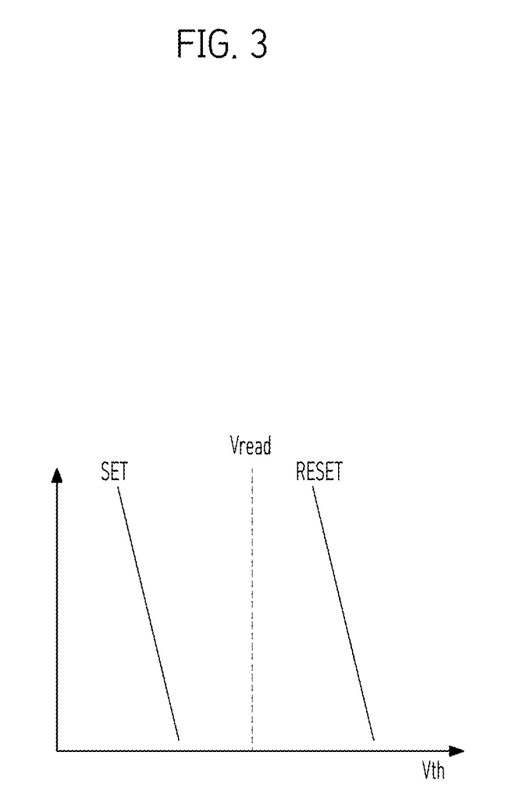

Referring to FIG. 3, the threshold voltage of the memory cell MC may be a threshold voltage Vth having a higher level when the memory cell MC is in the reset state RESET than when the memory cell MC is in the set state SET. After the start of a read operation, a read voltage Vread corresponding to a voltage between the threshold voltage of the set state SET and the threshold voltage of the reset state RESET may be provided to the memory cell MC. In this case, the memory cell MC in the set state SET may be turned on when being supplied with the read voltage Vread. The memory cell MC in the reset state RESET may be turned off when being supplied with the read voltage Vread. Accordingly, the read operation may be an operation of detecting whether the memory cell MC has been turned on and outputting the results of the detection. In this case, the read voltage Vread may correspond to the second bias voltage V_2 in FIG. 1.

A read operation may have the same current direction as a set write operation for changing the state of the memory cell into the set state. Accordingly, as the read operation is repeated, there is a risk that the threshold voltage of the memory cell in the reset state may be lowered.

Figure 4:
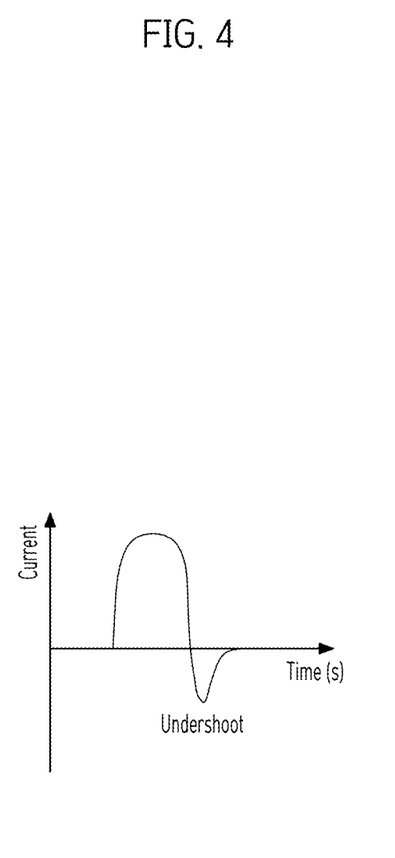

Referring to FIG. 4, the semiconductor device according to an embodiment of the present disclosure may provide a current having the same direction as a set write direction by providing the second bias voltage V_2 (Vread) to the memory cell MC after the start of a read operation. When the providing of the second bias voltage V_2 to the memory cell is discontinued, the read disturbance reduction circuit 500 may form an undershot current and provide the undershot current to the memory cell MC. In this case, the undershot current may be a current having a direction opposite the direction of a current that is formed due to the providing of the second bias voltage V_2 to the memory cell MC. For example, after the start of a read operation, the memory cell MC may be provided with a read pulse that is enabled to the voltage level of the second bias voltage V_2 for a set time. The inductor L of the read disturbance reduction circuit 500 may generate undershoot at a falling edge of the read pulse. In this case, a current that is provided to the memory cell MC while the undershoot is generated may be called the undershot current.

Figure 5:
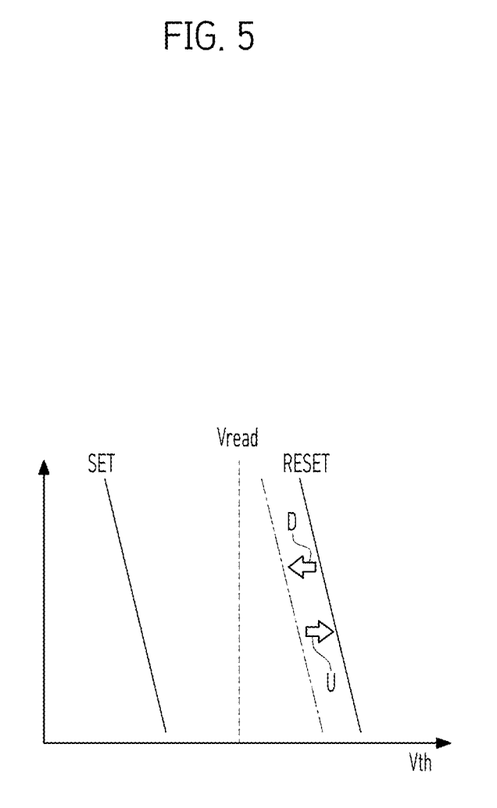

Referring to FIG. 5, the state of the memory cell MC may transition to one of the set state SET and the reset state RESET. The threshold voltage Vth of the memory cell MC in the reset state RESET may be higher than the threshold voltage Vth of the memory cell MC in the set state SET. As described above, the direction of a current for changing the state of the memory cell MC into the set state SET may be the same as the direction of a current that flows through the memory cell MC after the start of a read operation of the memory cell MC. Furthermore, the direction of a current for changing the state of the memory cell MC into the reset state RESET may be opposite the direction of a current for changing the state of the memory cell MC into the set state SET.

Accordingly, when a read operation is performed on the memory cell MC in the reset state RESET, a current having the same direction as the direction when the state of the memory cell MC transitions to the set state SET may be provided to the memory cell MC. Therefore, the voltage level of the threshold voltage Vth of the memory cell MC in the reset state RESET may be lowered (e.g., change in the direction of an arrow D shown in FIG. 5).

The semiconductor device according to an embodiment of the present disclosure may determine the state of the memory cell MC by providing the second bias voltage V_2 (read voltage) to the memory cell MC for a set time after the start of a read operation.

Furthermore, after the start of a read operation, when the state of the memory cell MC is determined, that is, when the second bias voltage V_2 (read voltage) that is provided to the memory cell MC is discontinued, the semiconductor device according to an embodiment of the present disclosure may generate undershoot on a current path including the memory cell MC. While the undershoot is performed, the memory cell MC may be provided with an undershot current having a direction that is opposite the direction of a current provided after the start of the read operation, that is, the undershot current having a direction the same as when the state of the memory cell MC transitions to the reset state RESET. Accordingly, the voltage level of the threshold voltage Vth of the memory cell MC in the reset state RESET, which was lowered after the start of the read operation, may rise again (e.g., change in the direction of an arrow U in FIG. 5).

An operation of each of the components of the semiconductor device according to an embodiment of the present disclosure may be more specifically described as follows with reference to FIG. 1.

First, a set write operation for changing the state of the memory cell MC into the set state may be described as follows.

The memory cell MC may be selected. For example, at least one memory cell MC from among a plurality of memory cells may be selected. In this case, the memory cell MC may be selected by the first and second selection switches 610 and 620. The memory cell MC that has been selected may be a memory cell that is connected to the first and second selection switches 610 and 620 that have been turned on. That is, the memory cell MC that has been selected may be a memory cell that is electrically connected between the first selection switch 610 that has been turned on by the bit line selection signal BL_s and the second selection switch 620 that has been turned on by the word line selection signal WL_s.

The write enable signal Write Enable may be a signal that is enabled after the start of a write operation, such as a reset write operation and a set write operation. Accordingly, the first connection switch 630 may be turned on.

As a result, the first bias voltage generation circuit 100 may be electrically connected to the memory cell MC through the first selection switch 610 that has been turned on.

After the start of a set write operation, the first bias voltage generation circuit 100 may provide the first bias voltage V_1 to the memory cell MC through the first selection switch 610 that has been turned on. At this time, the third bias voltage V_3 has a voltage value that less than the voltage value of the first bias voltage V_1.

Accordingly, after the start of the set write operation, a current path having a first direction in which a current flows from the first bias voltage generation circuit 100 to the first selection switch 610, the memory cell MC, the second selection switch 620, and the first connection switch 630 may be formed. The state of the memory cell MC may transition to the set state SET as the current path having the first direction is formed.

Next, a reset write operation for changing the state of the memory cell MC into the reset state may be described as follows.

The memory cell MC may be selected. For example, at least one memory cell MC from among a plurality of memory cells may be selected. In this case, the memory cell MC may be selected by the first and second selection switches 610 and 620. The memory cell MC that has been selected may be a memory cell that is connected to the first and second selection switches 610 and 620 that have been turned on. That is, the memory cell MC that has been selected may be a memory cell that is electrically connected between the first selection switch 610 that has been turned on by the bit line selection signal BL_s and the second selection switch 620 that has been turned on by the word line selection signal WL_s.

The write enable signal Write Enable may be a signal that is enabled after the start of a write operation, such as a reset write operation and a set write operation. Accordingly, the first connection switch 630 may be turned on.

As a result, the third bias voltage generation circuit 300 may be electrically connected to the memory cell MC by the first connection switch 630 that has been turned on and the second selection switch 620 that has been turned on.

After the start of the reset write operation, the third bias voltage generation circuit 300 may transmit the third bias voltage V_3 to the memory cell MC through the first connection switch 630 and the second selection switch 620 that have been turned on. At this time, the first bias voltage V_1 has a voltage value that less than the voltage value of the third bias voltage V_3.

Accordingly, after the start of the reset write operation, a current path having a second direction in which a current flows from the third bias voltage generation circuit 300 to the first connection switch 630, the second selection switch 620, the memory cell MC, and the first selection switch 610 may be formed.

As described above, the semiconductor device according to an embodiment of the present disclosure may be configured to form a current path having a different direction in the memory cell MC in order to change the state of the memory cell MC into the set state or the reset state.

Finally, a read operation of determining whether the state of the memory cell MC is the reset state or the set state may be described as follows.

The memory cell MC may be selected. For example, at least one memory cell MC from among a plurality of memory cells may be selected. In this case, the memory cell MC may be selected by the first and second selection switches 610 and 620. The memory cell MC that has been selected may be a memory cell that is connected to the first and second selection switches 610 and 620 that have been turned on. That is, the memory cell MC that has been selected may be a memory cell that is electrically connected between the first selection switch 610 that has been turned on by the bit line selection signal BL_s and the second selection switch 620 that has been turned on by the word line selection signal WL_s.

The second bias voltage generation circuit 200 may be electrically connected to the memory cell MC by the first selection switch 610 that has been turned on. The second bias voltage generation circuit 200 may provide the second bias voltage V_2 to the memory cell MC through the first selection switch 610 after the start of a read operation.

The read enable signal Read Enable may be a signal that is enabled after the start of a read operation. Accordingly, the second connection switch 640 may be turned on.

Accordingly, after the start of the read operation, a current path in which a current flows from the second bias voltage generation circuit 200 to the first selection switch 610, the memory cell MC, the second selection switch 620, the second connection switch 640, the read disturbance reduction circuit 500, and the sense amplifier 400 may be formed. In this case, the current path that is formed after the start of the read operation may be a current path having the same direction as the direction after the start of a set write operation because the current path is a current path in which the current flows into the first selection switch 610 and the memory cell MC and the second selection switch 620 on the basis of the memory cell MC. That is, the direction of the current path that is formed after the start of the read operation may be the first direction that is the same as the direction after the start of the set write operation.

As described above, in the read operation, all of the first selection switch 610, the second selection switch 620, and the second connection switch 640 may be turned on, and thus a current that flows through the memory cell MC may be transmitted to the sense amplifier 400 via the read disturbance reduction circuit 500 due to the second bias voltage V_2 that is provided by the second bias voltage generation circuit 200.

The sense amplifier 400 may determine the state of the memory cell MC by sensing the amount of current in the current path formed due to the second bias voltage V_2 that has been provided by the second bias voltage generation circuit 200 for a set time or the voltage level of a voltage that is formed due to the current, and may output the output signal D_out, that is, the results of the determination.

After the second bias voltage V_2 is provided to the memory cell MC for the set time, that is, after the sense amplifier 400 determines the state of the memory cell MC, the second bias voltage generation circuit 200 may stop the providing of the second bias voltage V_2. When the second bias voltage V_2 that is provided by the second bias voltage generation circuit 200 is discontinued, undershoot may be performed on a current path that is connected to the memory cell MC, the read disturbance reduction circuit 500, and the sense amplifier 400. In this case, the undershoot may form a current having a direction opposite the first direction, that is, a current that flows through the memory cell MC in the second direction. Such a current may be called an undershot current.

After the start of the read operation, the direction of the current that flows through the memory cell MC may be the same as the direction of a current for changing the state of the memory cell MC into the set state. Accordingly, as the read operation is repeated, the threshold voltage of the memory cell MC in the reset state may be at risk of being changed into the set state, that is, a state in which the voltage level of the threshold voltage is low.

As described above, the semiconductor device according to an embodiment of the present disclosure may include the read disturbance reduction circuit 500 in order to prevent a phenomenon in which the voltage level of the threshold voltage of the memory cell MC in the reset state is lowered after the start of a read operation. When a determination of the state of the memory cell MC after the start of a read operation is completed, the read disturbance reduction circuit 500 may form a current that flows through the memory cell MC in a direction opposite a direction in which the current flows through the memory cell MC after the start of the read operation. Accordingly, the voltage level of the threshold voltage of the memory cell MC, which has been lowered due to the read operation, may be restored.

Figure 6:
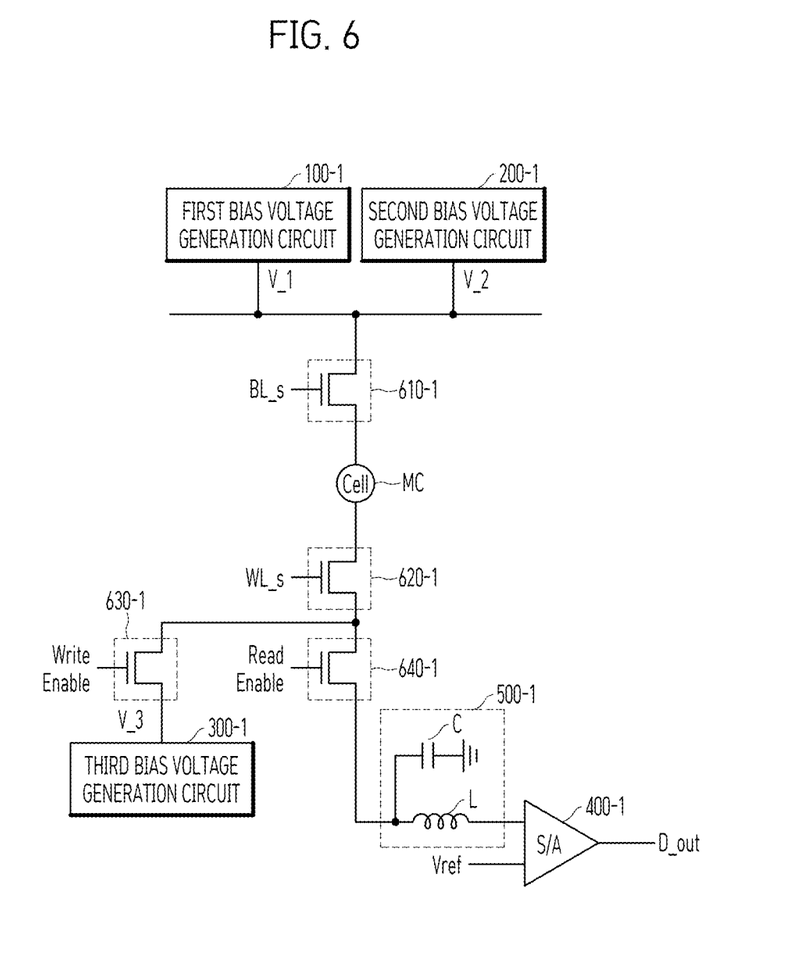
FIG. 6 illustrate a construction of a semiconductor device according to another embodiment of the present disclosure.

FIG. 6 is a diagram for describing a construction of a semiconductor device according to another embodiment of the present disclosure.

Referring to FIG. 6, the semiconductor device according to another embodiment of the present disclosure may include a first bias voltage generation circuit 100-1, a second bias voltage generation circuit 200-1, a third bias voltage generation circuit 300-1, a sense amplifier 400-1, a read disturbance reduction circuit 500-1, a first selection switch 610-1, a second selection switch 620-1, a first connection switch 630-1, and a second connection switch 640-1.

The first bias voltage generation circuit 100-1 may provide a first bias voltage V_1 to a memory cell MC for a set time after the start of a write operation. For example, the first bias voltage generation circuit 100-1 may provide the first bias voltage V_1 to the memory cell MC through the first selection switch 610-1 that is turned on for a set time after the start of a write operation. In this case, the first bias voltage V_1 may be a voltage for changing the state of the memory cell into a first state (e.g., a set state).

The second bias voltage generation circuit 200-1 may provide a second bias voltage V_2 to the memory cell MC for a set time after the start of a read operation. For example, the second bias voltage generation circuit 200-1 may provide the second bias voltage V_2 to the memory cell MC through the first selection switch 610-1 that is turned on for a set time after the start of a read operation. In this case, the second bias voltage V_2 may be a voltage having a voltage level at which the state of the memory cell may be determined.

The third bias voltage generation circuit 300-1 may provide a third bias voltage V_3 to the memory cell MC for a set time after the start of a write operation. For example, the third bias voltage generation circuit 300-1 may provide the third bias voltage V_3 to the memory cell MC through the second selection switch 620-1 and the first connection switch 630-1 that are turned on for a set time after the start of a write operation. In this case, the third bias voltage V_3 may be a voltage for changing the state of the memory cell into a second state (e.g., a reset state).

The sense amplifier 400-1 may determine the state of the memory cell MC by sensing a voltage that is formed due to the amount of a current that flows through the memory cell MC after the start of a read operation. For example, the sense amplifier 400-1 may determine whether the state of the memory cell MC is the set state or the reset state by comparing a reference voltage Vref to a voltage that is formed due to a current that flows through the memory cell MC that has been selected by the first and second selection switches 610-1 and 620-1. In this case, when the state of the memory cell MC is the set state, the sense amplifier 400-1 may output an output signal D_out having a low level. Furthermore, when the state of the memory cell MC is the reset state, the sense amplifier 400-1 may output the output signal D_out having a high level.

After the second bias voltage V_2 is provided to the memory cell MC that has been selected for a set time after the start of the read operation, when the providing of the second bias voltage V_2 to the memory cell MC is discontinued, the read disturbance reduction circuit 500-1 may generate undershoot at a falling edge at which the voltage level of the second bias voltage V_2 is decreased. While the undershoot is performed, the memory cell MC may be provided with a voltage having a polarity opposite the polarity of the voltage when the second bias voltage V_2 is provided, or may be provided with a current having a direction opposite the direction of the current when the second bias voltage V_2 is provided. For example, when the providing of the second bias voltage V_2 to the memory cell MC that has been selected after the start of a read operation is discontinued, the read disturbance reduction circuit 500-1 may generate an undershot voltage or an undershot current in a direction opposite the direction when the second bias voltage V_2 is provided. In this case, the undershot voltage or the undershot current may be provided to the memory cell MC for a time shorter than the time when the second bias voltage V_2 is provided to the memory cell MC, and may have a low voltage level or a small amount of current.

The read disturbance reduction circuit 500-1 may include an inductor L and a capacitor C. The inductor L may have one end connected to the second connection switch 640 and the other end connected to the sense amplifier 400-1. The capacitor C may have one end connected to the second connection switch 640-1 and the other end connected to a ground terminal. The inductor L and the capacitor C may be connected to a current path that is connected to the second bias voltage generation circuit 200-1, the first selection switch 610-1, the memory cell MC, the second selection switch 620-1, and the sense amplifier 400-1 after the start of a read operation. The inductor L and the capacitor C may generate undershoot when the providing of the second bias voltage V_2 to a current path that has been formed due to the second bias voltage V_2 provided by the second bias voltage generation circuit 200-1 after the start of a read operation is discontinued. Therefore, when the providing of the second bias voltage V_2 is discontinued after being provided for a set time after the start of the read operation, the memory cell MC may be provided with a current having a direction opposite the direction of the current when the second bias voltage V_2 is provided due to the undershoot phenomenon. Furthermore, the read disturbance reduction circuit 500-1 may adjust the size of the undershoot based on a ratio of the inductance level of the inductor L and the capacitance level of the capacitor C. For example, the size of the undershoot may be increased as the inductance level of the inductor L becomes higher relative to the capacitance level of the capacitor C. The size of the undershoot may be decreased as the capacitance level of the capacitor C becomes higher relative to the inductance level of the inductor L.

The first selection switch 610-1 and the second selection switch 620-1 may each be a switch for selecting the memory cell MC. The first selection switch 610-1 may transmit the first bias voltage V_1 or the second bias voltage V_2 to the memory cell MC that has been selected from among a plurality of memory cells or may discontinue the providing of the first bias voltage V_1 or the second bias voltage V_2 to the memory cell MC. For example, the first selection switch 610-1 may electrically connect the first bias voltage generation circuit 100-1 and the memory cell MC based on a bit line selection signal BL_s after the start of a write operation. Furthermore, the first selection switch 610-1 may electrically connect the second bias voltage generation circuit 200-1 and the memory cell MC based on the bit line selection signal BL_s after the start of a read operation.

The second selection switch 620-1 may electrically connect or separate the memory cell MC that has been selected and the first and second connection switches 630-1 and 640-1 in order to transmit the third bias voltage V_3 to the memory cell MC that has been selected, among a plurality of memory cells, or to electrically connect the sense amplifier 400-1 to the memory cell MC. For example, the second selection switch 620-1 may electrically connect or separate the memory cell MC that has been selected and the first and second connection switches 630-1 and 640-1 based on a word line selection signal WL_s after the start of a write or read operation.

The first connection switch 630-1 may electrically connect the third bias voltage generation circuit 300-1 and the second selection switch 620-1 after the start of a write operation. For example, the first connection switch 630-1 may electrically connect or separate the third bias voltage generation circuit 300-1 and the second selection switch 620-1 based on a write enable signal Write Enable.

The second connection switch 640-1 may electrically connect the read disturbance reduction circuit 500-1 and the second selection switch 620-1 after the start of a read operation. For example, the second connection switch 640-1 may electrically connect or separate the read disturbance reduction circuit 500-1 and the second selection switch 620-1 based on a read enable signal Read Enable.

In this case, the first selection switch 610-1, the second selection switch 620-1, the first connection switch 630-1 and the second connection switch 640-1 may each be implemented as at least one transistor.

An operation of the semiconductor device illustrated in FIG. 6 according to another embodiment of the present disclosure may be the same as the operation of the semiconductor device illustrated in FIG. 1. The semiconductor device illustrated in FIGS. 1 and 6 according to an embodiment of the present disclosure may generate undershoot on a current path that is formed after the start of a read operation. The semiconductor device illustrated in FIG. 6 may additionally include the capacitor in the read disturbance reduction circuit compared to the semiconductor device illustrated in FIG. 1. The size of undershoot may be adjusted by the capacitor that has been additionally included.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure.

What is claimed is:
1. A semiconductor device comprising:
a read disturbance reduction circuit;

a first selection switch that is turned on based on a bit line selection signal;
a second selection switch that that is turned on based on a word line selection signal;
a memory cell electrically connected between the first selection switch and the second selection switch;
a first bias voltage generation circuit configured to provide a first bias voltage to the memory cell through the first selection switch;
a second bias voltage generation circuit configured to provide a second bias voltage to the memory cell through the first selection switch;
a third bias voltage generation circuit configured to provide a third bias voltage to the memory cell through the second selection switch; and
a connection switch configured to electrically connect or separate the read disturbance reduction circuit and the second selection switch.

2. The semiconductor device of claim 1, wherein:
a state of the memory cell transitions to a set state when the first bias voltage is provided to the memory cell through the first selection switch,
a state of the memory cell transitions to a reset state when the third bias voltage is provided to the memory cell through the second selection switch, and
the memory cell performs a read operation by receiving the second bias voltage through the first selection switch.

3. The semiconductor device of claim 2, wherein the memory cell is electrically connected to the read disturbance reduction circuit through the second selection switch and the connection switch after the start of the read operation.

4. The semiconductor device of claim 3, wherein the read disturbance reduction circuit performs undershoot when the providing of the second bias voltage to the memory cell is discontinued after the start of the read operation.

5. The semiconductor device of claim 4, wherein the undershoot produces an undershot current having a direction identical with a direction of the current when the third bias voltage is provided to the memory cell, and the undershot current is provided through the second selection switch to the memory cell.

6. The semiconductor device of claim 3, wherein the read disturbance reduction circuit comprises an inductor.

7. The semiconductor device of claim 6, wherein the read disturbance reduction circuit further comprises a capacitor configured to adjust a size of the undershoot.

8. A semiconductor device comprising:
a memory cell having a state which transitions to a set state when a current having a first direction flows through the memory cell and transitions to a reset state when a current having a second direction flows through the memory cell;
a sense amplifier configured to determine the state of the memory cell by detecting a voltage level of the memory cell attributable to a current path formed by providing the memory cell with a current having a direction identical with the first direction; and
a read disturbance reduction circuit configured to generate undershoot on the current path when the sense amplifier has determined the state of the memory cell.

9. The semiconductor device of claim 8, wherein the read disturbance reduction circuit comprises an inductor that is connected to the current path.

10. The semiconductor device of claim 9, wherein the read disturbance reduction circuit further comprises a capacitor configured to adjust a size of the undershoot.

11. The semiconductor device of claim 8, wherein the first direction and the second direction are opposite directions.

12. The semiconductor device of claim 11, wherein the undershoot causes the current having the second direction to flow through the memory cell in the current path when the sense amplifier has determined the state of the memory cell.

13. A semiconductor device comprising:
a memory cell connected between a bit line and a word line;
a sense amplifier connected to the word line and configured to sense a threshold voltage of the memory cell after a start of a read operation; and
a read disturbance reduction circuit connected to a node between the sense amplifier and the word line and configured to generate undershoot on a current that flows through the memory cell in the node after the start of the read operation.

14. The semiconductor device of claim 13, wherein the undershoot is generated due to a reduction in an amount of the current.

15. The semiconductor device of claim 14, wherein the undershoot produces an undershot current having a direction opposite a direction of the current.

16. The semiconductor device of claim 13, wherein the read disturbance reduction circuit comprises an inductor.

17. The semiconductor device of claim 16, wherein the read disturbance reduction circuit additionally comprises a capacitor configured to adjust an amount of the undershoot current.

18. An operating method of a semiconductor device, comprising:
providing a first current that flows through a memory cell after a start of a read operation;
sensing, using to the first current, a threshold voltage of the memory cell;
reducing an amount of the first current; and
in response to the reduction of the amount of the first current, performing undershoot so that a second current having a direction opposite a direction of the first current flows through the memory cell.

19. The operating method of claim 18, wherein a sense amplifier configured to sense, using to the first current, the threshold voltage of the memory cell is connected to one end of the memory cell.

20. The operating method of claim 19, wherein an inductor is connected between the one end of the memory cell and the sense amplifier.

* * * * *